(12) United States Patent
Okada et al.

(10) Patent No.: US 11,092,790 B2
(45) Date of Patent: Aug. 17, 2021

(54) IMAGING LENS AND IMAGING APPARATUS

(71) Applicant: FUJIFILM Corporation, Tokyo (JP)

(72) Inventors: Kazuyoshi Okada, Saitama (JP); Taro Asami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 184 days.

(21) Appl. No.: 16/580,929

(22) Filed: Sep. 24, 2019

(65) Prior Publication Data

US 2020/0103635 A1    Apr. 2, 2020

(30) Foreign Application Priority Data

Sep. 28, 2018   (JP)   .............................. JP2018-184406

(51) Int. Cl.
| | | |
|---|---|---|
| *G02B 15/177* | (2006.01) | |
| *G02B 15/167* | (2006.01) | |
| *G02B 13/18* | (2006.01) | |
| G02B 13/00 | (2006.01) | |
| G02B 5/00 | (2006.01) | |
| G02B 9/64 | (2006.01) | |

(52) U.S. Cl.
CPC ........... *G02B 15/177* (2013.01); *G02B 13/18* (2013.01); *G02B 15/167* (2013.01); *G02B 5/005* (2013.01); *G02B 9/64* (2013.01); *G02B 13/0045* (2013.01)

(58) Field of Classification Search
CPC ...... G02B 9/64; G02B 13/0045; G02B 13/18; G02B 5/005; G02B 15/177; G02B 15/167

USPC ................ 359/717, 740, 754, 755, 793, 794
See application file for complete search history.

(56) References Cited

U.S. PATENT DOCUMENTS

| | | | |
|---|---|---|---|
| 2014/0268367 A1* | 9/2014 | Kawamura | G02B 13/04 359/708 |
| 2015/0098138 A1* | 4/2015 | Shirasuna | G02B 9/64 359/749 |
| 2017/0269327 A1* | 9/2017 | Mori | G02B 9/62 |
| 2018/0088299 A1* | 3/2018 | Okada | G02B 13/04 |

FOREIGN PATENT DOCUMENTS

| | | |
|---|---|---|
| JP | 2010-072359 A | 4/2010 |
| JP | 2017-083771 A | 5/2017 |

* cited by examiner

*Primary Examiner* — Evelyn A Lester
(74) *Attorney, Agent, or Firm* — Studebaker & Brackett PC

(57) ABSTRACT

The imaging lens consists of, in order from an object side, a first lens group, a stop, and a positive second lens group. The second lens group has a negative lens on a side closest to an object and has a single lens or a cemented lens having a positive refractive power on a side closest to an image. Predetermined conditional expressions relating to a back focus, an incidence angle of a principal light ray on the image plane, a maximum image height, a distance from a lens surface on the side closest to the object to a lens surface on the side closest to the image, a distance from an object side principal point of the second lens group to a stop, and a focal length of the second lens group are satisfied.

17 Claims, 14 Drawing Sheets

EXAMPLE 2

EXAMPLE 4

FIG. 5 EXAMPLE 5

EXAMPLE 6

EXAMPLE 2

EXAMPLE 3

IMAGING LENS AND IMAGING APPARATUS

CROSS-REFERENCE TO RELATED APPLICATIONS

The present application claims priority under 35 U.S.C. § 119 to Japanese Patent Application No. 2018-184406, filed on Sep. 28, 2018. The above application is hereby expressly incorporated by reference, in its entirety, into the present application.

BACKGROUND OF THE INVENTION

1. Field of the Invention

The present invention relates to an imaging lens and an imaging apparatus.

2. Description of the Related Art

In the related art, as an imaging lens used in an imaging apparatus, an imaging lens, composed of two lens groups in which each lens group having a positive refractive power is disposed on an object side and an image side of an aperture stop, has been known. For example, in JP2010-072359A, a lens system which has the above-described composition and is applicable to a single lens reflex camera is disclosed. In JP2017-083771A, a lens system which has the above-described composition and is applicable to an inspection apparatus is disclosed. In addition, in an imaging apparatus, a complementary metal oxide semiconductor (CMOS) sensor is widely used as an imaging element used in a combination with an imaging lens.

SUMMARY OF THE INVENTION

In recent years, accompanying a wider use of global shutter with the CMOS sensor, incidence angle dependence of a sensor has become more prominent than before. In a case of using an imaging lens having a large incidence angle of a principal light ray incident on the sensor, even in a case where peripheral light amount characteristics of the imaging lens itself are made favorable, a light amount at a peripheral portion of an image is reduced due to the incidence angle dependence of the sensor.

In addition, in recent years, in order to make it possible to capture a wide-range image at once, a size of the sensor has increased, and it has become more difficult to suppress a reduction of the light amount at the peripheral portion of the image.

On the other hand, due to facts that a standard of a mount which is a joint portion between a camera and an imaging lens is fixed, and that various mechanical parts should be disposed at a peripheral portion of the imaging lens, or the like, a space available for a light path has a limitation. By increasing the size of the sensor, in a case where light is caused to be incident from the imaging lens to the sensor, the mount itself and/or the mechanical parts become an obstacle to block light and the sensor may not obtain a sufficient light amount.

The lens system disclosed in JP2010-072359A has a composition disadvantageous for securing the light amount due to a large incidence angle of the principal light ray on an image plane. For the lens system disclosed in JP2017-083771A, a bigger space is required to increase the light amount, which leads to an increase in size.

The present invention has been made in consideration of the above-described situation. An object to be achieved by an embodiment of the present invention is to provide an imaging lens which, even in a case where a restriction is put on a space between an imaging lens and an image plane, is capable of securing a more light amount and has a favorable optical performance, while suppressing an increase in size, and an imaging apparatus comprising the imaging lens.

Specific means for solving the above-described object includes following aspects.

According to a first aspect of the present invention, there is provided an imaging lens consisting of, in order from an object side toward an image side:
a first lens group;
a stop; and
a second lens group having a positive refractive power,
 wherein the second lens group includes a negative lens on a side closest to an object,
the second lens group includes a lens component having a positive refractive power on a side closest to an image,
the lens component is a single lens or a cemented lens, and
in a case where
 a back focus in an air conversion length is Bf,
 an angle between a principal light ray incident on a maximum image height of an image plane and an axis parallel to an optical axis is CRA (Chief Ray Angle),
 the maximum image height is Y,
 a distance on the optical axis from a lens surface on the side closest to the object to a lens surface on the side closest to the image is TL,
 a distance on the optical axis from an object side principal point of the second lens group, as a reference, to the stop is dSt,
 a focal length of the second lens group is f2,
 regarding CRA, a sign of a clockwise angle with respect to the axis parallel to the optical axis is negative and a sign of a counterclockwise angle is positive, and
 regarding dSt, a sign of a distance from the reference to the object side is negative and a sign of a distance from the reference to the image side is positive,
Conditional Expressions (1), (2), (3), and (4) are satisfied, which are represented by $$0<\{Bf\times\tan(CRA)\}/Y<0.4 \tag{1}$$

$$0.2<Bf/TL<0.6 \tag{2}$$

$$-1<dSt/f2<-0.6 \tag{3}$$

$$0.3<Y/Bf-\tan(CRA)<0.4 \tag{4}$$

In the imaging lens according to the first aspect, it is preferable that at least one of Conditional Expression (1-1), (2-1), (3-1), or (4-1) is satisfied.

$$0.1<\{Bf\times\tan(CRA)\}/Y<0.3 \tag{1-1}$$

$$0.3<Bf/TL<0.5 \tag{2-1}$$

$$-0.9<dSt/f2<-0.7 \tag{3-1}$$

$$0.32<Y/Bf-\tan(CRA)<0.4 \tag{4-1}$$

In the imaging lens according to the first aspect, in a case where the back focus in the air conversion length is Bf and the maximum image height is Y, it is preferable that Conditional Expression (5) is satisfied and it is more preferable that Conditional Expression (5-1) is satisfied.

$$1.85 < Bf/Y < 4 \quad (5)$$

$$2 < Bf/Y < 3 \quad (5\text{-}1)$$

In the imaging lens according to the first aspect, in a case where an angle between an edge light ray which is a light ray most distant from the optical axis among light rays incident on the maximum image height of the image plane and the axis parallel to the optical axis is URA, and regarding URA, a sign of a clockwise angle with respect to the axis parallel to the optical axis is negative and a sign of a counterclockwise angle is positive, and a unit of URA is a degree, it is preferable that Conditional Expression (6) is satisfied and it is more preferable that Conditional Expression (6-1) is satisfied.

$$-5 < URA < 5 \quad (6)$$

$$-3 < URA < 0 \quad (6\text{-}1)$$

In the imaging lens according to the first aspect, the second lens group may consist of, in order from the object side toward the image side, the negative lens, two positive lenses, and the lens component having a positive refractive power. The second lens group may also consist of, in order from the object side toward the image side, the negative lens, a positive lens, a cemented lens obtained by cementing two lenses which have refractive powers of signs different from each other, and a positive lens.

In the imaging lens according to the first aspect, it is preferable that the first lens group has a negative lens and two positive lenses, in consecutive order from the side closest to the image toward the object side.

In the imaging lens according to the first aspect, in a case where a focal length of the imaging lens is f and a focal length of the first lens group is f1, it is preferable that Conditional Expression (7) is satisfied and it is more preferable that Conditional Expression (7-1) is satisfied.

$$0 < f/f1 < 0.7 \quad (7)$$

$$0.2 < f/f1 < 0.6 \quad (7\text{-}1)$$

In the imaging lens according to the first aspect, in a case where a radius of curvature of a lens surface on the side closest to the image in the first lens group is rf and a radius of curvature of a lens surface on the side closest to the object in the second lens group is rr, it is preferable that Conditional Expression (8) is satisfied and it is more preferable that Conditional Expression (8-1) is satisfied.

$$-60 < (rf-rr)/(rf+rr) < 60 \quad (8)$$

$$-50 < (rf-rr)/(rf+rr) < 50 \quad (8\text{-}1)$$

An imaging apparatus according to a second aspect of the present invention comprises the imaging lens according to the first aspect.

Note that in the present specification, the terms "consisting of ~" and "consists of ~" are intended that, in addition to the listed components, a lens which substantially has no refractive power, an optical element which is not a lens, such as a stop, a filter, and a cover glass, a mechanical portion such as a lens flange, a lens barrel, an imaging element (also referred to as a sensor), and a camera shaking correction mechanism, or the like may be included.

Note that in the present specification, the term "~group having a positive refractive power" means that the group as a whole has the positive refractive power. Similarly, note that the term "lens component having a positive refractive power" means that the lens component as a whole has the positive refractive power. The term "lens having a positive refractive power" and the term "positive lens" are synonymous. The term "lens having a negative refractive power" and the term "negative lens" are synonymous. The "lens group" is not limited to a composition to consist of a plurality of lenses, and may be composed of only one lens.

The term "single lens" means one lens that is not cemented with another lens. However, a compound aspheric lens (a lens which is integrally composed of a spherical lens and a film having an aspheric shape formed on the spherical lens, and functions as one aspheric lens as a whole) is not considered as a cemented lens, and is treated as a single lens. The sign of the refractive power, the surface shape of the lens surface, and the radius of curvature of a lens including the aspheric surface are considered in terms of the paraxial region unless otherwise noted. Regarding the sign of the radius of curvature, the sign of the radius of curvature of the surface having a shape convex toward the object side is set to be positive, and the sign of the radius of curvature of the surface having a shape convex toward the image side is set to be negative.

The "focal length" used in the conditional expression is a paraxial focal length. The "back focus in the air conversion length" used in the conditional expression is an air conversion length on the optical axis from the lens surface on the side closest to the image to a focus position on the image side. The values used in the conditional expressions are values based on a d line in a state of focusing on the object at infinity. The "d line", "C line", and "F line" described in the present specification are bright lines, the wavelength of the d line is 587.56 nm (nanometer), the wavelength of the C line is 656.27 nm (nanometer), and the wavelength of the F line is 486.13 nm (nanometer).

According to an embodiment of the present invention, it is possible to provide an imaging lens which, even in a case where a restriction is put on a space between the imaging lens and an image plane, is capable of securing a more light amount and has a favorable optical performance, while suppressing an increase in size, and an imaging apparatus comprising the imaging lens.

DESCRIPTION OF THE PREFERRED EMBODIMENTS

Figure 1:
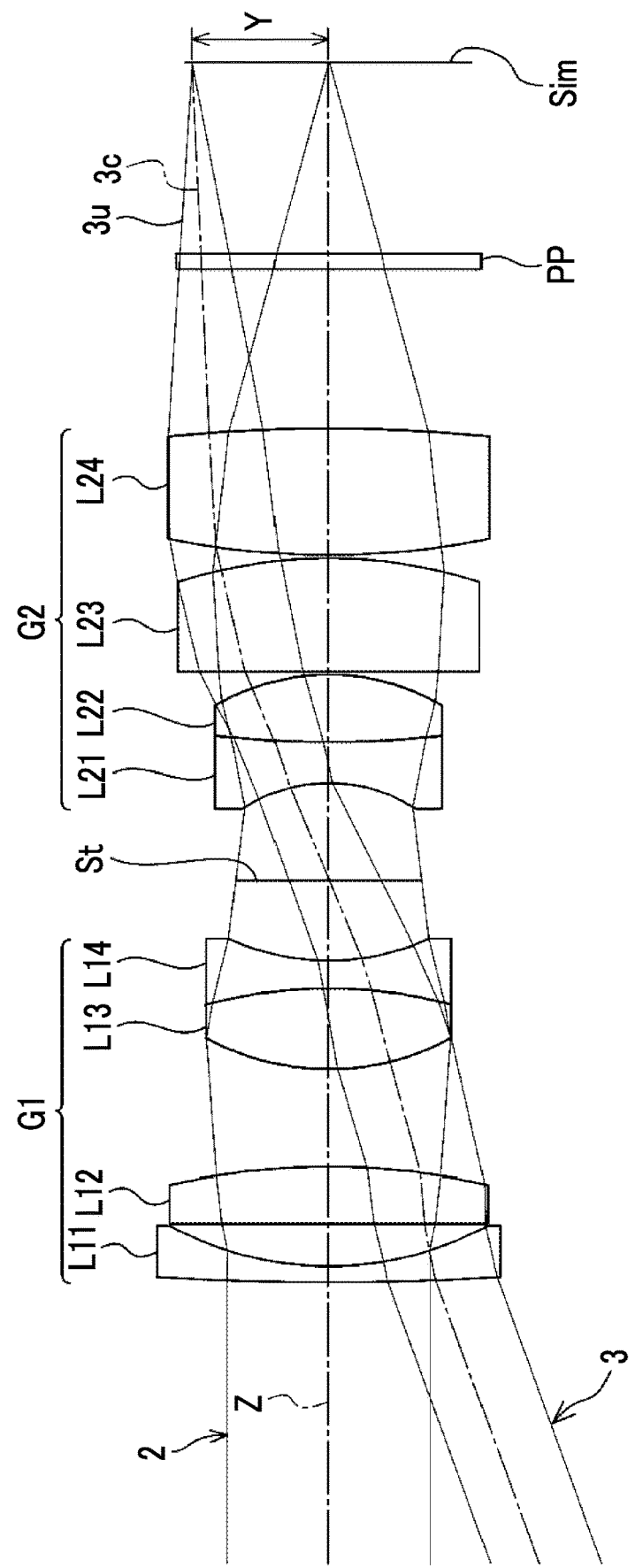
FIG. 1 is a cross-sectional view showing a composition of an imaging lens according to an embodiment of the present invention, which corresponds to an imaging lens of Example 1 of the present invention.

Hereinafter, an embodiment of an imaging lens of the present invention will be described in detail with reference to the drawings. FIG. 1 is a cross-sectional view showing a composition of an imaging lens according to an embodiment of the present invention. The example shown in FIG. 1 corresponds to an imaging lens of Example 1 to be described later. In FIG. 1, a left side is an object side, a right side is an image side, and a state of focusing on an object at infinity is shown. In addition, in FIG. 1, an on-axis light flux 2 and a light flux 3 of a maximum image height are also shown as a light flux.

Note that in FIG. 1, on the assumption that the imaging lens is applied to an imaging apparatus, an example, in which a parallel-plate optical member PP is disposed between the imaging lens and an image plane Sim, is shown. The optical member PP is a member assuming various filters, and/or a cover glass or the like. The various filters are, for example, a low pass filter, an infrared ray cut filter, and a filter that cuts a specific wavelength range. The optical member PP is a member having no refractive power, and a configuration in which the optical member PP is omitted is also possible.

The imaging lens consists of, in order from an object side toward an image side along an optical axis Z, a first lens group G1, an aperture stop St, and a second lens group G2 having a positive refractive power.

As an example, in the imaging lens shown in FIG. 1, the first lens group G1 consists of four lenses L11 to L14, in order from the object side toward the image side, and the second lens group G2 consists of four lenses L21 to L24, in order from the object side toward the image side. However, as shown in the examples to be described later, the number of lenses composing each lens group can be different from the number shown in FIG. 1. In addition, the aperture stop St shown in FIG. 1 indicates a position thereof on an optical axis rather than indicate a shape thereof.

The second lens group G2 is composed of a negative lens on a side closest to an object and a lens component having a positive refractive power on a side closest to an image. Here, the lens component is a lens having only two air contact surfaces on the optical axis, which are surfaces on the object side and the image side, and specifically, one lens component refers to one single lens or one cemented lens. By disposing a negative lens on the side closest to the object in the second lens group G2, it is possible to make a back focus long and to make an exit pupil position far, which, as a result, leads to an advantage for reducing an incidence angle of a principal light ray on the image plane Sim. In addition, by disposing a negative lens on the side closest to the object in the second lens group G2, an advantage for reducing an F-Number is obtained, which leads to an advantage for securing a light amount. By disposing the lens component having a positive refractive power on the side closest to the image in the second lens group G2, an advantage for reducing the incidence angle of the principal light ray on the image plane Sim is obtained.

The second lens group G2 may consist of, in order from the object side toward the image side, the negative lens, two positive lenses, and the lens component having a positive refractive power. Such a case is advantageous for reducing the incidence angle of the principal light ray on the image plane Sim while suppressing an occurrence of fifth-order coma aberration and fifth-order astigmatism.

Alternatively, the second lens group G2 may also consist of, in order from the object side toward the image side, the negative lens, a positive lens, a cemented lens obtained by cementing two lenses having refractive powers of signs different from each other, and a positive lens. Note that the cemented lens obtained by cementing two lenses having refractive powers of signs different from each other may be a cemented lens obtained by cementing a positive lens and a negative lens in order from the object side, or may be a cemented lens obtained by cementing a negative lens and a positive lens in order from the object side. A case where the second lens group G2 has the above-described composition is advantageous for reducing the incidence angle of the principal light ray on the image plane Sim while suppressing an occurrence of chromatic aberration.

The first lens group G1 may be composed of a negative lens and two positive lenses in consecutive order from the side closest to the image toward the object side. In such a case, since the imaging lens has a composition in which the first lens group G1 and the second lens group G2 have a high symmetry with the aperture stop St as a central axis, it becomes easy to correct aberration by canceling out aberration occurring at the second lens group G2 with aberration occurring at the first lens group G1. In a case where the first lens group G1 adopts the above-described composition, a lens surface on the side closest to the image in the first lens group G1 and a lens surface on the side closest to the object in the second lens group G2 may be a concave surface, and in such a case, in addition to the advantage of an aberration correction, an effect that is advantageous for a small F-number can be obtained.

The first lens group G1 may be composed of two or more positive lenses, and two negative lenses in consecutive order from the side closest to the object toward the image side. By setting the two or more positive lenses, an advantage for correcting spherical aberration is obtained, and by the two negative lenses on the object side, an advantage for suppressing fifth-order or higher distortion is obtained.

The number of lenses composing the first lens group G1 may be three or more and six or less. By setting the number of lenses composing the first lens group G1 to three or more, it becomes easy to achieve a favorable aberration correction. By setting the number of lenses composing the first lens group G1 to six or less, an advantageous for reducing an overall length of the lens system and a diameter of the lens.

Next, the composition with respect to the conditional expressions will be described. The imaging lens is composed to satisfy Conditional Expression (1), (2), (3), and (4), in a case where a back focus in an air conversion length is Bf, an angle between the principal light ray incident on the maximum image height of the image plane Sim and an axis parallel to the optical axis Z is CRA, the maximum image height is Y, a distance on the optical axis from the lens surface on the side closest to the object to the lens surface on the side closest to the image is TL, a distance on the optical axis from an object side principal point of the second lens group G2, as a reference, to the aperture stop St is dSt, and a focal length of the second lens group G2 is f2.

$$0<\{Bf\times\tan(CRA)\}/Y<0.4 \quad (1)$$

$$0.2<Bf/TL<0.6 \quad (2)$$

$$-1<dSt/f2<-0.6 \quad (3)$$

$$0.3<Y/Bf-\tan(CRA)<0.4 \quad (4)$$

Figure 13:
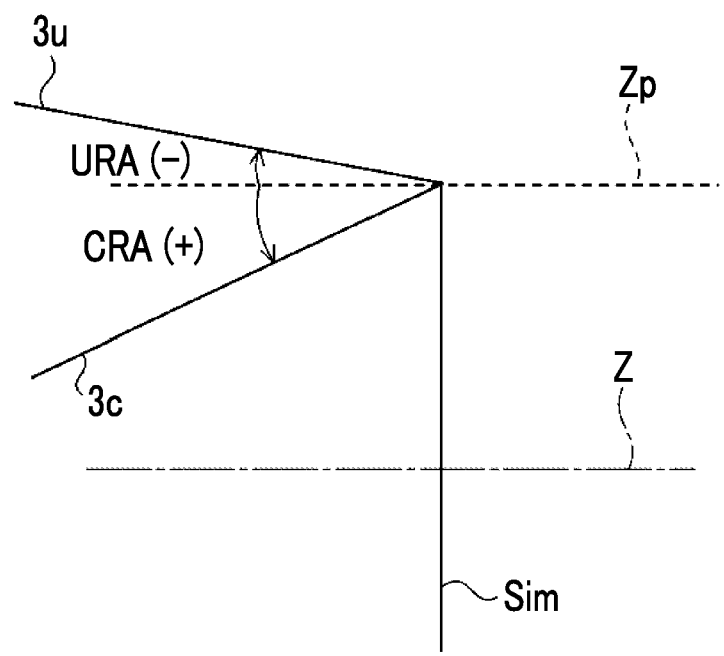
FIG. 13 is a diagram for describing signs of CRA and URA.

Note that regarding dSt, a sign of the distance from the reference to the object side is negative and a sign of the distance from the reference to the image side is positive. Regarding CRA, a sign of a clockwise angle with respect to the axis parallel to the optical axis Z is negative and a sign of a counterclockwise angle is positive. Note that CRA is an angle, which has a smaller absolute value, of two angles between the principal light ray and the axis parallel to the optical axis Z. As an example, FIG. 13 shows a principal light ray 3c of the maximum image height, the image plane Sim, and an axis Zp parallel to the optical axis Z in a case where CRA has a positive value.

In such a manner that it is not allowed to be equal to or less than the lower limit in Conditional Expression (1), a space from a lens on the side closest to the image to the image plane Sim does not become too small, and thus it is possible to secure a space for a mechanical mechanism of the imaging apparatus or the like. In such a manner that it is not allowed to be equal to or greater than the upper limit in Conditional Expression (1), it is possible to suppress an increase of the incidence angle of the principal light ray on the image plane Sim. Note that in a case of a composition in which Conditional Expression (1-1) is satisfied, it is possible to obtain more favorable characteristics.

$$0.1<\{Bf\times\tan(CRA)\}/Y<0.3 \quad (1-1)$$

In such a manner that it is not allowed to be equal to or less than the lower limit in Conditional Expression (2), the space from the lens on the side closest to the image to the image plane Sim does not become too small, and thus it is possible to secure the space for the mechanical mechanism of the imaging apparatus or the like. In such a manner that it is not allowed to be equal to or greater than the upper limit in Conditional Expression (2), it is possible to secure a space for disposing of lenses such that the overall length of a lens portion does not become too short, which is advantageous for the aberration correction. Note that in a case of a composition in which Conditional Expression (2-1) is satisfied, it is possible to obtain more favorable characteristics.

$$0.3<Bf/TL<0.5 \quad (2-1)$$

As dSt/f2 according to Conditional Expression (3) approaches −1, the incidence angle of the principal light ray on the image plane Sim can have a value close to 0, but the diameters of the lenses on the image side tend to be large. In such a manner that it is not allowed to be equal to or less than the lower limit in Conditional Expression (3), it is possible to suppress the increase of the diameters of the lenses on the image side. In such a manner that it is not allowed to be equal to or greater than the upper limit in Conditional Expression (3), it is possible to suppress the increase of the incidence angle of the principal light ray on the image plane Sim. By satisfying Conditional Expression (3), it becomes easy to reduce the incidence angle of the principal light ray on the image plane Sim while suppressing the increase of the lens system in size. Note that in a case of a composition in which Conditional Expression (3-1) is satisfied, it is possible to obtain more favorable characteristics.

$$-0.9<dSt/f2<-0.7 \quad (3-1)$$

In such a manner that it is not allowed to be equal to or less than the lower limit in Conditional Expression (4), it is possible to suppress an reduction of an effective diameter of the lens surface on the side closest to the image, and thus it is possible to suppress a reduction of the light amount. In such a manner that it is not allowed to be equal to or greater than the upper limit in Conditional Expression (4), the effective diameter of the lens surface on the side closest to the image does not become too large, and thus it is possible to suppress an increase of the lens system in size. Note that in a case of a composition in which Conditional Expression (4-1) is satisfied, it is possible to obtain more favorable characteristics.

$$0.32<Y/Bf-\tan(CRA)<0.4 \quad (4-1)$$

Next, conditional expressions which are preferably further satisfied will be described. In the imaging lens, in a case where the back focus in the air conversion length is Bf and the maximum image height is Y, it is preferable that Conditional expression (5) is satisfied. In such a manner that it is not allowed to be equal to or less than the lower limit in Conditional Expression (5), the space from the lens on the side closest to the image to the image plane Sim does not become too small, and thus it is possible to secure the space for the mechanical mechanism of the imaging apparatus or the like. In such a manner that it is not allowed to be equal to or greater than the upper limit in Conditional Expression (5), it is possible to suppress the overall length of the lens system, which is advantageous for suppressing an increase of the lens system in size even in a case where an image size is big. Note that in a case of a composition in which Conditional Expression (5-1) is satisfied, it is possible to obtain more favorable characteristics.

$$1.85<Bf/Y<4 \quad (5)$$

$$2<Bf/Y<3 \quad (5-1)$$

In addition, in the imaging lens, in a case where an angle between an edge light ray 3u which is a light ray most distant from the optical axis Z among light rays incident on the maximum image height of the image plane Sim and the axis parallel to the optical axis Z is URA, and regarding URA, the sign of the clockwise angle with respect to the axis parallel to the optical axis Z is negative, the sign of the counterclockwise angle is positive, and a unit of URA is a degree, it is preferable that Conditional Expression (6) is satisfied. Note that the edge light ray 3u is a light ray which is a so-called upper side ray or upper ray. URA is an angle, which has a smaller absolute value, of two angles between the edge light ray 3u and the axis parallel to the optical axis Z. As an example, FIG. 13 shows the edge light ray 3u, the image plane Sim, and the axis Zp parallel to the optical axis Z in a case where URA has a negative value. In such a manner that it is not allowed to be equal to or less than the lower limit in Conditional Expression (6), it becomes easy to suppress the reduction of the light amount at a periphery and to reduce the incidence angle of the principal light ray on the image plane Sim, together. In such a manner that it is not allowed to be equal to or greater than the upper limit in Conditional Expression (6), it becomes easy to secure the light amount without enlarging an opening of mechanical parts on the image side such as a mount. Note that in a case of a composition in which Conditional Expression (6-1) is satisfied, it is possible to obtain more favorable characteristics.

$$-5<URA<5 \quad (6)$$

$$-3<URA<0 \quad (6-1)$$

In addition, in the imaging lens, in a case where a focal length of the imaging lens is f and a focal length of the first lens group G1 is f1, it is preferable that Conditional Expression (7) is satisfied. In such a manner that it is not allowed to be equal to or less than the lower limit in Conditional Expression (7), it becomes easy to reduce the incidence angle of the principal light ray on the image plane Sim. In such a manner that it is not allowed to be equal to or greater than the upper limit in Conditional Expression (7), it is possible to suppress the occurrence of the aberration. Note that in a case of a composition in which Conditional Expression (7-1) is satisfied, it is possible to obtain more favorable characteristics.

$$0<f/f1<0.7 \quad (7)$$

$$0.2<f/f1<0.6 \quad (7-1)$$

In addition, in the imaging lens, in a case where a radius of curvature of the lens surface on the side closest to the image in the first lens group G1 is rf and a radius of curvature of the lens surface on the side closest to the object in the second lens group G2 is rr, it is preferable that Conditional Expression (8) is satisfied. Conditional Expression (8) is an expression with respect to a shape factor of an air lens which is formed by two lens surfaces facing each other with the aperture stop St interposed. By satisfying Conditional Expression (8), it is possible to suppress a coma aberration. Note that in a case of a composition in which Conditional Expression (8-1) is satisfied, it is possible to obtain more favorable characteristics.

$$-60<(rf-rr)/(rf+rr)<60 \quad (8)$$

$$-50<(rf-rr)/(rf+rr)<50 \quad (8-1)$$

The above-described preferable compositions and available compositions may be optionally combined, and it is preferable to selectively adopt the compositions in accordance with the required specification as appropriate. With the technology of the present invention, even in a case a restriction is put on a space between the imaging lens and the image plane Sim, it is possible to realize an imaging lens which is capable of securing a more light amount and has a favorable optical performance, while suppressing the increase in size.

Figure 14:
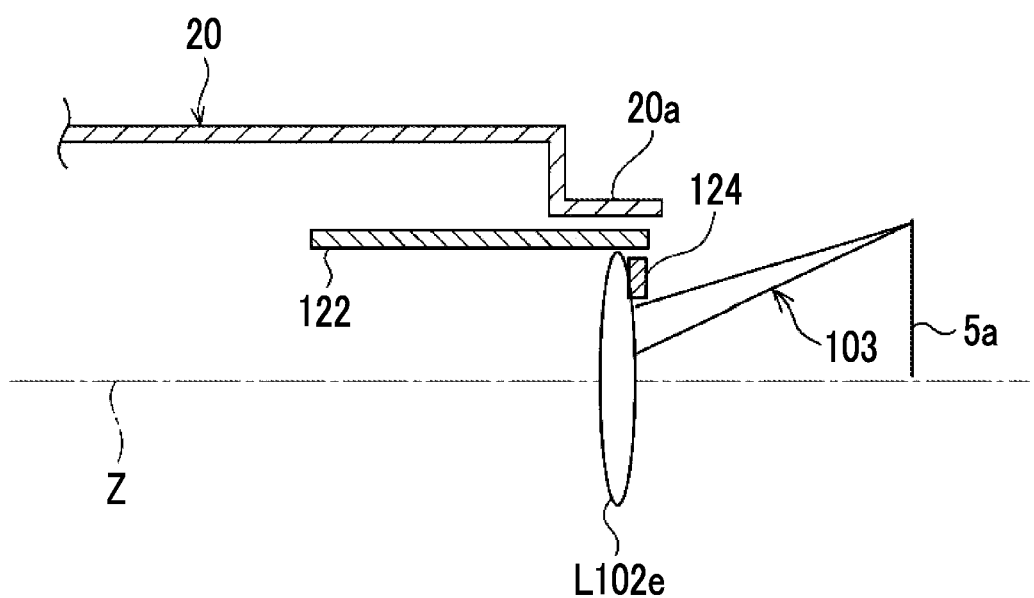
FIG. 14 is a diagram as a comparative example and is an outline composition diagram of principal parts in a case where an imaging lens in the related art is mounted on an imaging apparatus.
Figure 15:
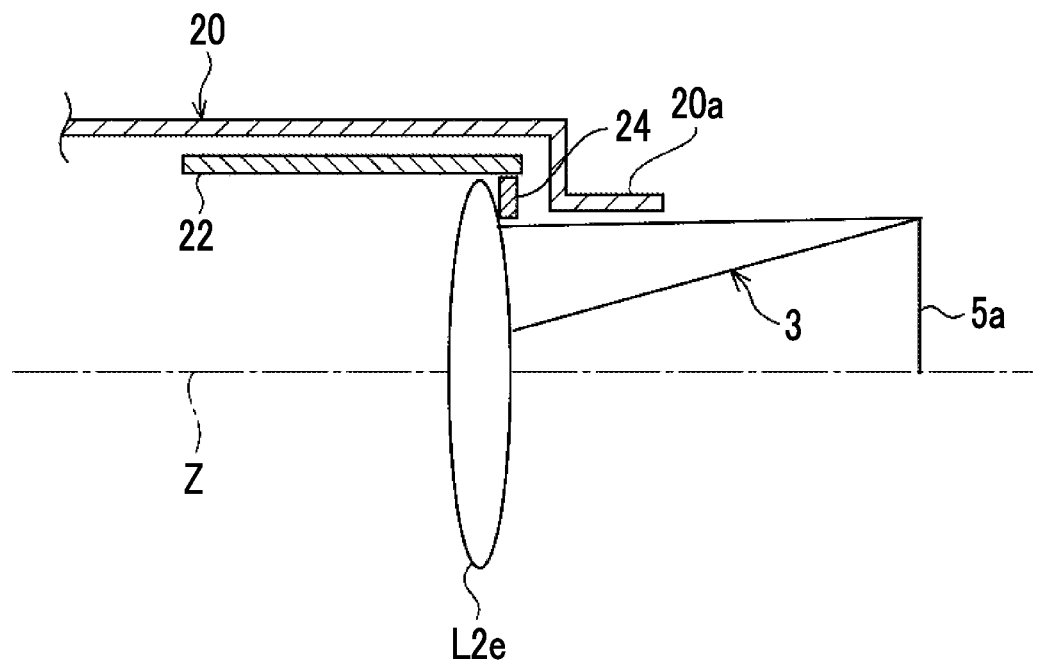
FIG. 15 is an outline composition diagram of principal parts in a case where an imaging lens according to an embodiment of the present invention is mounted on an imaging apparatus.

Here, differences between an imaging lens in the related art and the imaging lens according to the technology of the present invention will be described with reference to FIGS. 14 and 15. In FIGS. 14 and 15, a left side is the object side and a right side is the image side, and for convenience of understanding, FIGS. 14 and 15 conceptually show only a lens on the side closest to the image among the lenses included in the imaging lens, and for parts other than the lens, show only a portion above the optical axis Z in the drawings.

FIG. 14 is an outline composition diagram, in a case where an imaging lens in the related art is mounted on an imaging apparatus, of a vicinity of an image side of the imaging lens, and is shown as a comparative example. In FIG. 14, inside a lens barrel 20, an imaging lens, a moving frame 122 used in a case of moving the imaging lens along the optical axis Z, and a holding ring 124 for holding the imaging lens are disposed. The moving frame 122 is provided in a space between an inner wall of the lens barrel and the imaging lens. The holding ring 124 is provided to contact a peripheral portion of a surface on the image side of a lens L102e which is a lens on the side closest to the image in the imaging lens. In the composition of FIG. 14, the lens L102e, a part of the moving frame 122, and the holding ring 124 are positioned inside a mount 20a which is a tapered portion of an image side end of the lens barrel 20. Therefore, as a light path of a light flux 103 of the maximum image height from the lens L102e toward an imaging surface 5a of a sensor, the opening of the mount 20a can be used rather partially than entirely.

As an example, FIG. 15 shows an outline composition diagram, in a case where the imaging lens according to the technology of the present invention is mounted on an imaging apparatus, of a vicinity of an image side of the imaging lens. The lens barrel 20 and the imaging surface 5a of the sensor shown in FIG. 15 are the same as those shown in FIG. 14. As described above, since the imaging lens according to the technology of the present invention has the long back focus, it is possible to dispose the lens L2e, which is a lens on the side closest to the image, on the object side further than the mount 20a. Therefore, the moving frame 22 and the holding ring 24 can also be disposed on the object side further than the mount 20a. In addition, as described above, the imaging lens according to the technology of the present invention is composed to reduce the incidence angle of the principal light ray on the image plane Sim, and thus even in a case where the imaging lens is disposed on the object side further than the mount 20a, a composition, in which the light flux 3 of the maximum image height from the lens L2e toward the imaging surface 5a of the sensor is not blocked by the inner wall of the mount, is possible. In the composition shown in FIG. 15, since the opening of the mount 20a can be entirely used as the light path, compared with the composition shown in FIG. 14, a light amount obtained in the imaging surface 5a can be significantly increased.

Next, numerical examples of the imaging lens of the present invention will be described.

Example 1

A cross-sectional view showing the composition of an imaging lens of Example 1 is shown in FIG. 1, and since the showing method and the composition thereof are as described above, a redundant description will be partially omitted herein. The imaging lens of Example 1 consists of, in order from the object side toward the image side, a first lens group G1 having a positive refractive power, an aperture stop St, and a second lens group G2 having a positive refractive power. The first lens group G1 consists of four lenses L11 to L14, in order from the object side toward the image side, and the second lens group G2 consists of four lenses L21 to L24, in order from the object side toward the image side.

Regarding the imaging lens of Example 1, Table 1 shows basic lens data and Table 2 shows specifications. In Table 1, the column of Sn shows surface numbers, where the surface on the side closest to the object is the first surface and the surface number increases one by one toward the image side, the column of R shows radii of curvature of the respective surfaces, and the column of D shows surface distances on the optical axis between each surface and the adjacent surface on the image side. In addition, the column of Nd shows refractive indices of the respective components at the d line and the column of vd shows Abbe numbers of the respective components based on the d line. In the imaging lens, an effective diameter on the lens surface on the side closest to the image is set, and the column of ED shows a diameter of the effective diameter.

In Table 1, the sign of a radius of curvature of the surface having a shape convex toward the object side is set to be positive, and the sign of the radius of curvature of the surface having a shape convex toward the image side is set to be negative. In Table 1, the optical member PP and the aperture stop St are also shown, and the surface number and a term of (St) are noted in a place of the surface number of a surface corresponding to the aperture stop St. A value in the bottom of the column of D in Table 1 indicates a distance between the image plane Sim and the surface on the side closest to the image in the table.

In Table 2, values of the focal length f of the imaging lens, the back focus Bf in the air conversion length, the F-Number FNo., the maximum total angle of view 2ω, the maximum image height Y, and the angle CRA between the principal light ray incident on the maximum image height Y of the image plane Sim and the axis parallel to the optical axis Z are shown based on the d line. (°) in the place of 2ω and CRA indicates that the unit thereof is a degree. The values shown in Table 2 are values based on the d line in a state of focusing on the object at infinity.

In data of each table, a degree is used as a unit of an angle, and mm (millimeter) is used as a unit of a length, but the optical system can be used in a case of being enlarged or reduced in proportion as well, and thus other units may be appropriately used. In addition, each of following tables shows numerical values rounded off to predetermined decimal places.

TABLE 1

Example 1

| Sn | R | D | Nd | vd | ED |
|---|---|---|---|---|---|
| 1 | 191.20967 | 0.990 | 1.71300 | 53.87 | |
| 2 | 21.78713 | 2.680 | | | |
| 3 | ∞ | 3.570 | 1.84667 | 23.79 | |
| 4 | −47.87325 | 6.200 | | | |
| 5 | 16.78523 | 5.100 | 1.80401 | 46.57 | |
| 6 | −30.35700 | 1.750 | 1.61293 | 37.01 | |
| 7 | 15.55703 | 5.080 | | | |
| 8(St) | ∞ | 6.200 | | | |
| 9 | −10.42256 | 2.570 | 1.84667 | 23.79 | |
| 10 | 65.34800 | 4.280 | 1.58913 | 61.25 | |
| 11 | −14.60676 | 0.190 | | | |
| 12 | ∞ | 7.200 | 1.85151 | 40.73 | |
| 13 | −32.27998 | 0.230 | | | |
| 14 | 53.50733 | 8.000 | 1.85151 | 40.73 | |
| 15 | −100.00663 | 10.000 | | | 20.70 |
| 16 | ∞ | 1.000 | 1.51680 | 64.20 | |
| 17 | ∞ | 12.151 | | | |

TABLE 2

Example 1

| | |
|---|---|
| f | 24.267 |
| Bf | 22.810 |
| FNo. | 1.85 |
| 2ω(°) | 42.6 |

TABLE 2-continued

Example 1

| | |
|---|---|
| Y | 9.20 |
| CRA(°) | 2.662 |

Figure 7:
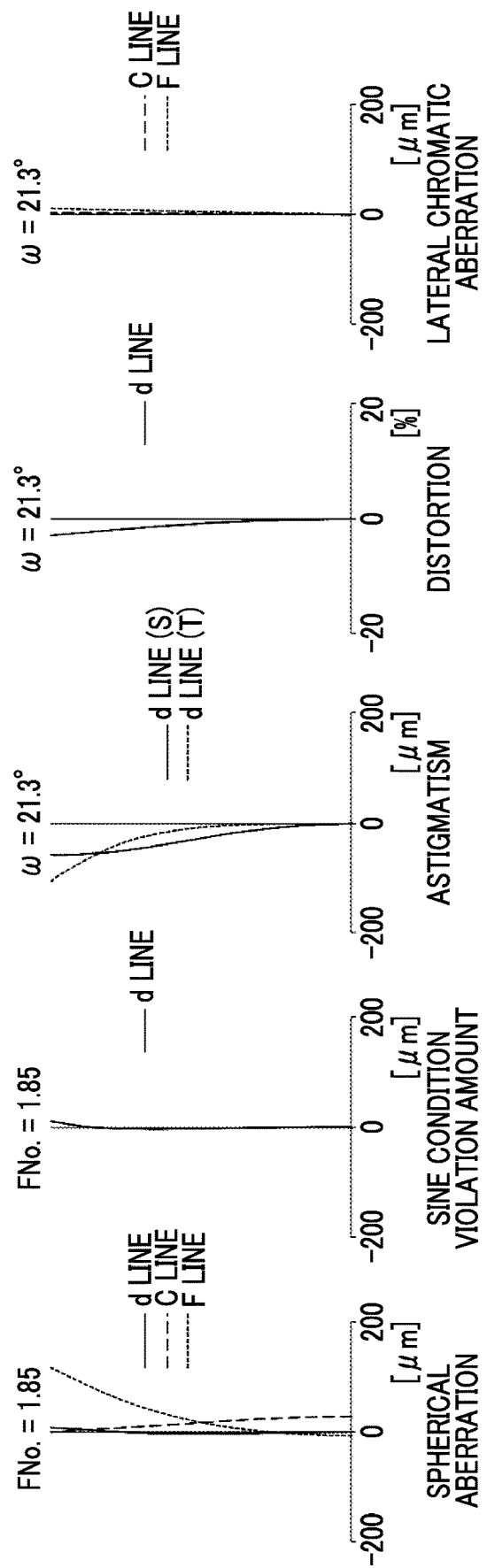
FIG. 7 is each aberration diagram of the imaging lens of Example 1 of the present invention.

Each aberration diagram of the imaging lens of Example 1 in a state of focusing on the object at infinity is shown in FIG. 7. FIG. 7 shows spherical aberration, sine condition violation amount, astigmatism, distortion, and lateral chromatic aberration in order from the left. In the spherical aberration diagram, aberrations at the d line, the C line, and the F line are respectively indicated by a solid line, a long dashed line, and a short dashed line. In the astigmatism diagram, aberration in the sagittal direction at the d line is indicated by a solid line, and aberration in the tangential direction at the d line is indicated by a short dashed line. In the distortion diagram and the sine condition violation amount diagram, aberration at the d line is indicated by a solid line. In the lateral chromatic aberration diagram, aberrations at the C line and the F line are respectively indicated by a long dashed line and a short dashed line. In the spherical aberration diagram and the sine condition violation amount diagram, FNo. indicates an F-Number and in other aberration diagrams, ω indicates half angle of view.

The symbols, the meanings, the description method, and the showing method of each data item relating to Example 1 are the same in following Examples unless otherwise noted, and thus descriptions thereof will not be repeated below.

Example 2

Figure 2:
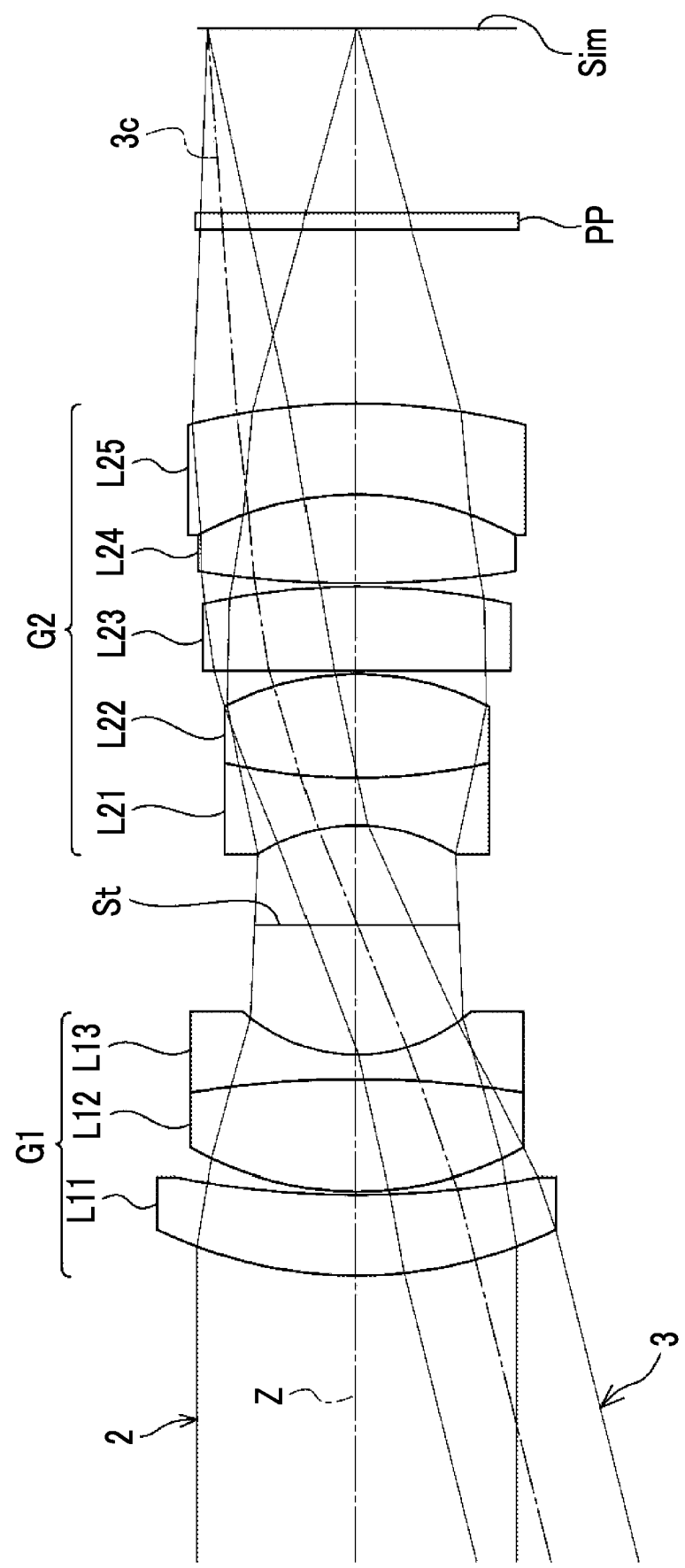
FIG. 2 is a cross-sectional view showing a composition of an imaging lens of Example 2 of the present invention.
Figure 8:
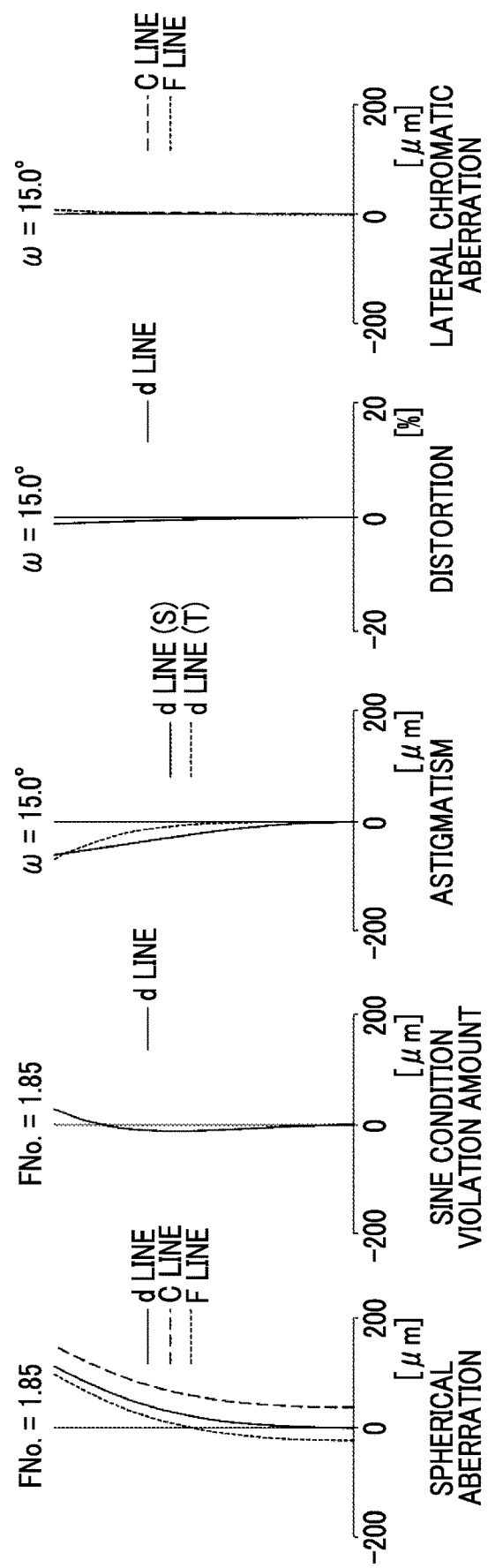
FIG. 8 is each aberration diagram of the imaging lens of Example 2 of the present invention.

FIG. 2 is a cross-sectional view showing a composition of an imaging lens of Example 2. The imaging lens of Example 2 consists of, in order from the object side toward the image side, a first lens group G1 having a positive refractive power, an aperture stop St, and a second lens group G2 having a positive refractive power. The first lens group G1 consists of three lenses L11 to L13, in order from the object side toward the image side, and the second lens group G2 consists of five lenses L21 to L25, in order from the object side toward the image side. Regarding the imaging lens of Example 2, Table 3 shows basic lens data, Table 4 shows specifications, and FIG. 8 shows each aberration diagram.

TABLE 3

Example 2

| Sn | R | D | Nd | vd | ED |
|---|---|---|---|---|---|
| 1 | 27.30317 | 4.660 | 1.85151 | 40.73 | |
| 2 | 56.93400 | 0.190 | | | |
| 3 | 20.46031 | 6.450 | 1.61800 | 63.40 | |
| 4 | −63.24000 | 1.420 | 1.57501 | 41.51 | |
| 5 | 10.21454 | 7.520 | | | |
| 6(St) | ∞ | 5.750 | | | |
| 7 | −11.17117 | 2.770 | 1.72342 | 38.02 | |
| 8 | 35.98700 | 6.000 | 1.80401 | 46.57 | |
| 9 | −17.07431 | 0.200 | | | |
| 10 | ∞ | 4.860 | 1.83481 | 42.73 | |
| 11 | −41.60967 | 0.200 | | | |
| 12 | 62.73342 | 5.130 | 1.49700 | 81.59 | |
| 13 | −19.73500 | 5.270 | 1.74001 | 28.29 | |
| 14 | −40.51807 | 10.000 | | | 19.86 |
| 15 | ∞ | 1.000 | 1.51680 | 64.20 | |
| 16 | ∞ | 10.664 | | | |

TABLE 4

| Example 2 | |
| --- | --- |
| f | 34.791 |
| Bf | 21.324 |
| FNo. | 1.85 |
| 2ω(°) | 30.0 |
| Y | 9.20 |
| CRA(°) | 4.655 |

Example 3

Figure 3:
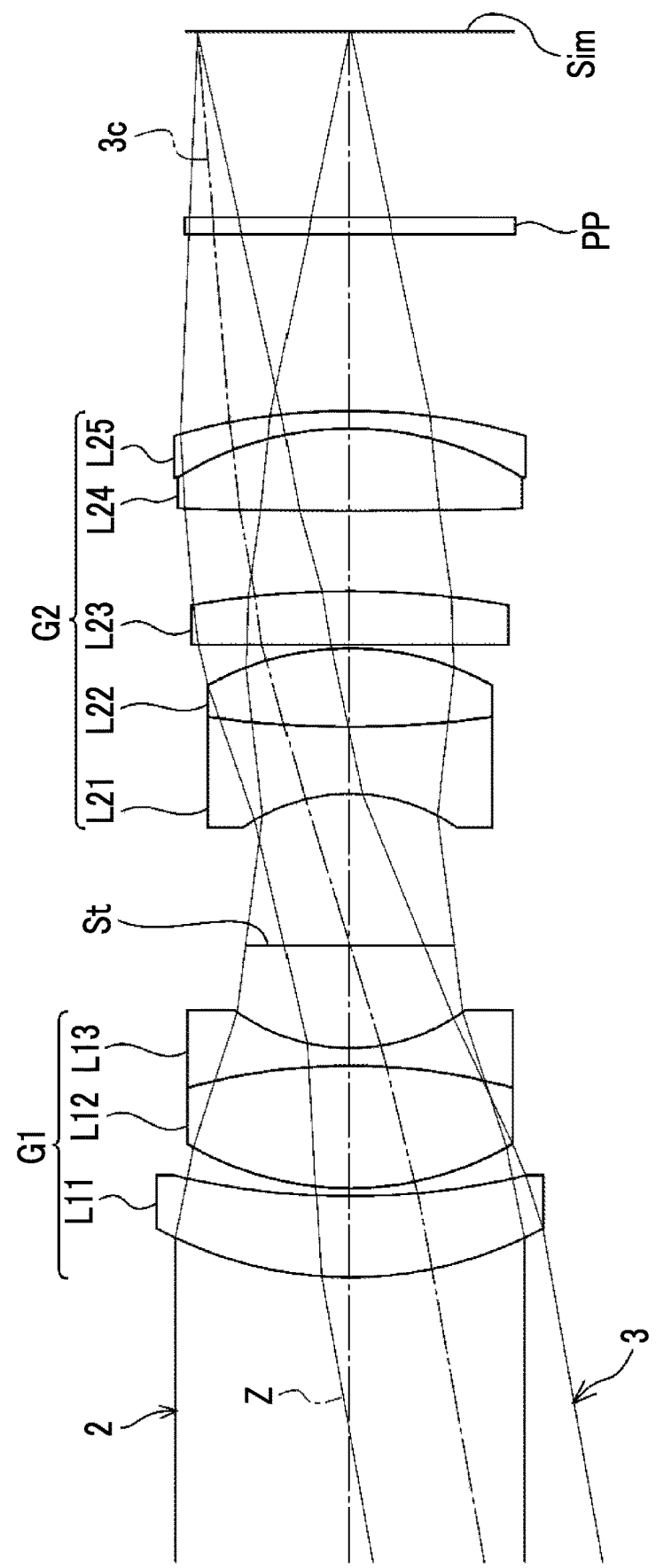
FIG. 3 is a cross-sectional view showing a composition of an imaging lens of Example 3 of the present invention.
Figure 9:
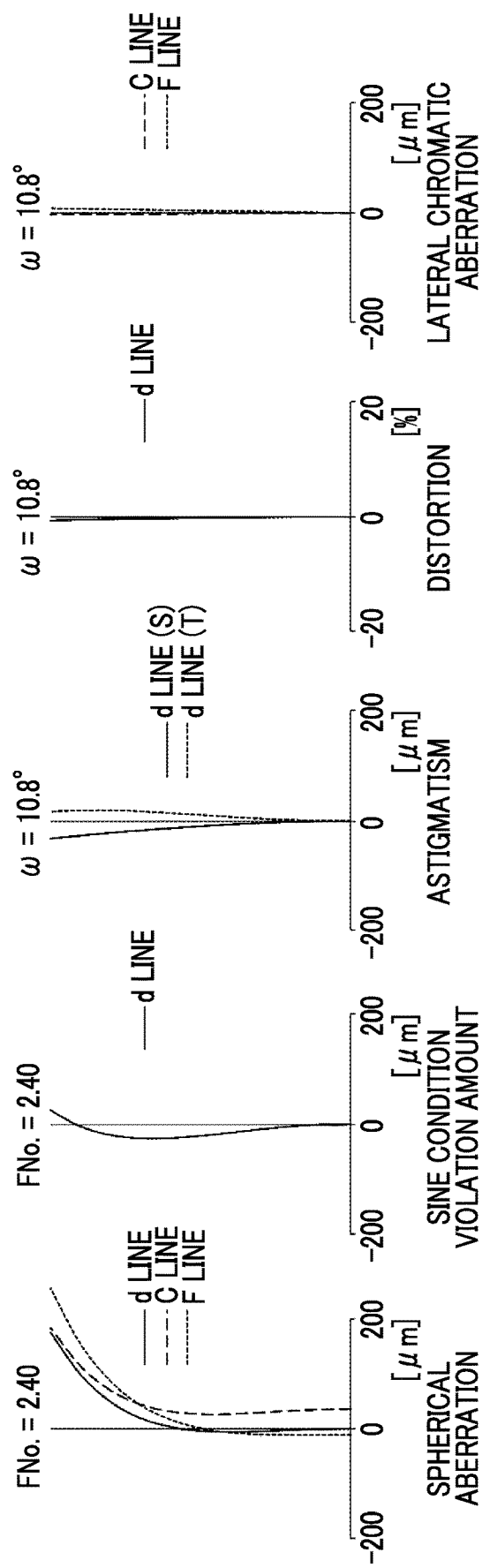
FIG. 9 is each aberration diagram of the imaging lens of Example 3 of the present invention.

FIG. 3 is a cross-sectional view showing a composition of an imaging lens of Example 3. The imaging lens of Example 3 consists of, in order from the object side toward the image side, a first lens group G1 having a positive refractive power, an aperture stop St, and a second lens group G2 having a positive refractive power. The first lens group G1 consists of three lenses L11 to L13, in order from the object side toward the image side, and the second lens group G2 consists of five lenses L21 to L25, in order from the object side toward the image side. Regarding the imaging lens of Example 3, Table 5 shows basic lens data, Table 6 shows specifications, and FIG. 9 shows each aberration diagram.

TABLE 5

| Example 3 | | | | | |
| --- | --- | --- | --- | --- | --- |
| Sn | R | D | Nd | vd | ED |
| 1 | 23.92200 | 4.600 | 1.83481 | 42.73 | |
| 2 | 44.82386 | 0.450 | | | |
| 3 | 18.87661 | 6.960 | 1.61800 | 63.40 | |
| 4 | −35.78300 | 1.000 | 1.60342 | 38.01 | |
| 5 | 11.32301 | 5.820 | | | |
| 6(St) | ∞ | 8.620 | | | |
| 7 | −10.83681 | 3.750 | 1.59551 | 39.23 | |
| 8 | 59.35200 | 4.460 | 1.61800 | 63.40 | |
| 9 | −17.01530 | 0.200 | | | |
| 10 | ∞ | 3.030 | 1.85026 | 32.27 | |
| 11 | −54.11358 | 4.570 | | | |
| 12 | 352.20715 | 4.690 | 1.49700 | 81.59 | |
| 13 | −19.12200 | 1.000 | 1.54814 | 45.83 | |
| 14 | −37.04692 | 10.000 | | | 20.30 |
| 15 | ∞ | 1.000 | 1.51680 | 64.20 | |
| 16 | ∞ | 10.542 | | | |

TABLE 6

| Example 3 | |
| --- | --- |
| f | 48.436 |
| Bf | 21.201 |
| FNo. | 2.40 |
| 2ω(°) | 21.6 |
| Y | 9.20 |
| CRA(°) | 5.021 |

Example 4

Figure 4:
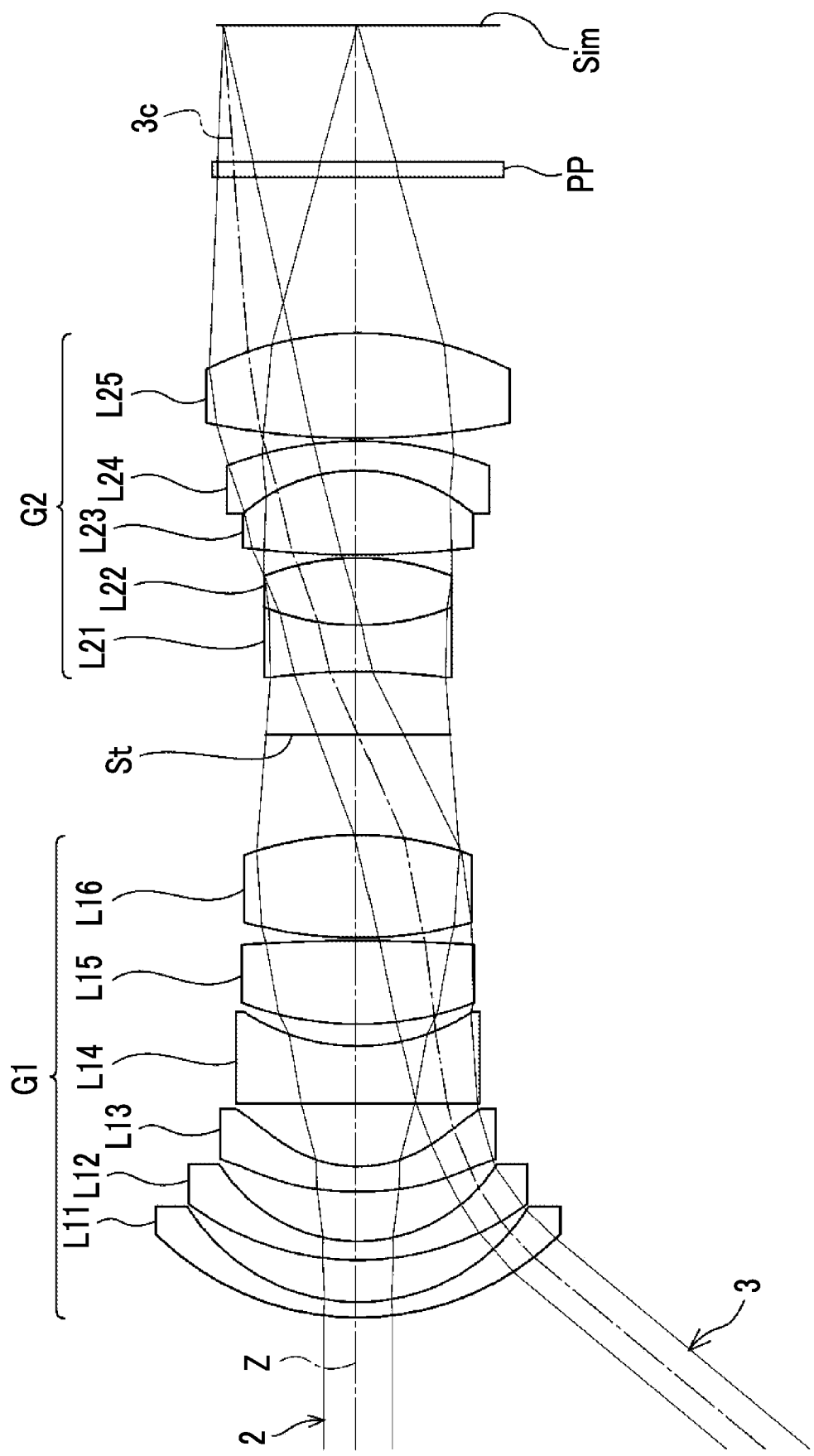
FIG. 4 is a cross-sectional view showing a composition of an imaging lens of Example 4 of the present invention.
Figure 10:
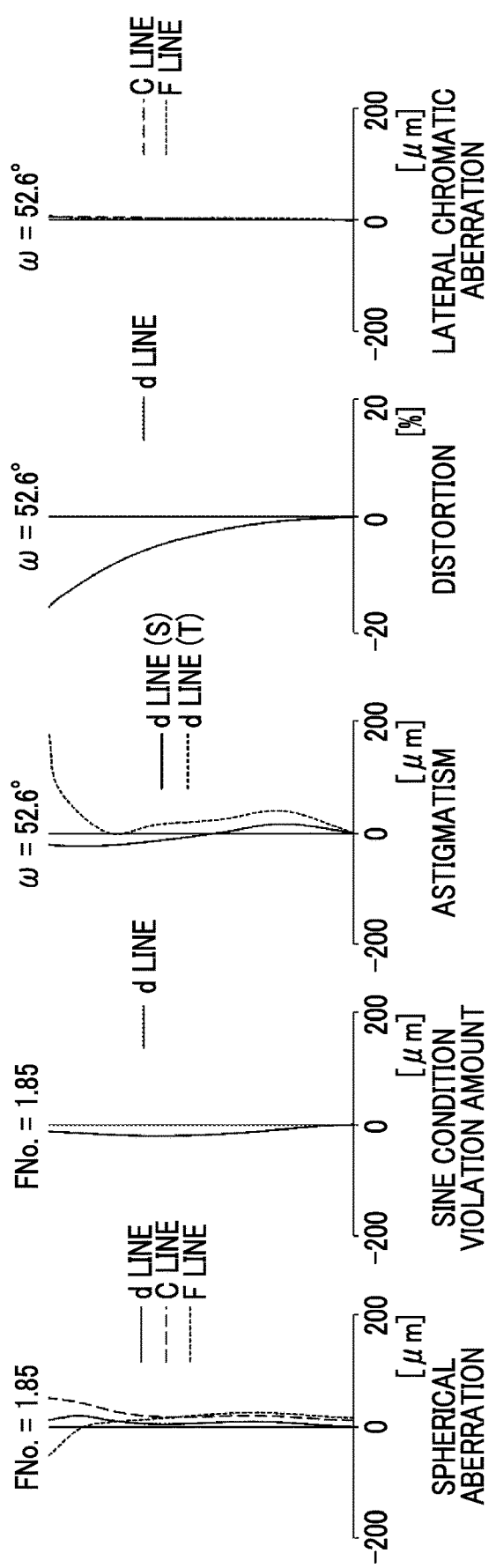
FIG. 10 is each aberration diagram of the imaging lens of Example 4 of the present invention.

FIG. 4 is a cross-sectional view showing a composition of an imaging lens of Example 4. The imaging lens of Example 4 consists of, in order from the object side toward the image side, a first lens group G1 having a positive refractive power, an aperture stop St, and a second lens group G2 having a positive refractive power. The first lens group G1 consists of six lenses L11 to L16, in order from the object side toward the image side, and the second lens group G2 consists of five lenses L21 to L25, in order from the object side toward the image side. Regarding the imaging lens of Example 4, Table 7 shows basic lens data, Table 8 shows specifications, Table 9 shows aspherical coefficients, and FIG. 10 shows each aberration diagram.

In Table 7, the sign * is attached to the surface number of the aspheric surface, and the numerical value of the paraxial radius of curvature is noted in the column of the radius of curvature of the aspheric surface. In Table 9, the row of Sn shows the surface number of the aspheric surface, and the rows of KA and Am (m=3, 4, 5, . . . 20) show the numerical values of the aspherical coefficients for each aspheric surface. The "E±n" (n: an integer) in numerical values of the aspherical coefficients of Table 9 indicates "×10$^{±n}$". KA and Am are the aspherical coefficients in the aspheric expression represented by following Expression.

$$Zd = C \times h^2 / \{1 + (1 - KA \times C^2 \times h^2)^{1/2}\} + \Sigma Am \times h^m$$

where,
Zd: Aspheric depth (the length of a perpendicular drawn to a plane perpendicular to the optical axis which the aspherical vertex contacts, from a point on the aspherical surface of the height h)
h: Height (the distance from the optical axis to the lens surface)
C: Inverse of the paraxial radius of curvature
KA, Am: Aspherical coefficient, and
Σ in an aspheric expression means the sum with respect to m.

TABLE 7

| Example 4 | | | | | |
| --- | --- | --- | --- | --- | --- |
| Sn | R | D | Nd | vd | ED |
| 1 | 19.01414 | 0.990 | 1.95375 | 32.32 | |
| 2 | 13.21044 | 2.690 | | | |
| 3 | 18.80483 | 1.210 | 1.91083 | 35.26 | |
| 4 | 10.76444 | 3.190 | | | |
| *5 | 28.42070 | 1.600 | 1.58135 | 59.40 | |
| *6 | 9.40102 | 4.030 | | | |
| 7 | ∞ | 3.630 | 1.48749 | 70.42 | |
| 8 | 13.75262 | 1.410 | | | |
| 9 | 21.79808 | 5.330 | 1.60342 | 38.01 | |
| 10 | −113.93623 | 0.200 | | | |
| 11 | 28.52005 | 6.580 | 1.62005 | 36.35 | |
| 12 | −21.98843 | 6.430 | | | |
| 13(St) | ∞ | 4.060 | | | |
| 14 | −42.07139 | 2.970 | 1.95375 | 32.32 | |
| 15 | 16.61900 | 4.310 | 1.53775 | 74.70 | |
| 16 | −16.61900 | 0.200 | | | |
| 17 | 61.56997 | 5.400 | 1.53775 | 74.70 | |
| 18 | −11.58900 | 1.880 | 1.91083 | 35.26 | |
| 19 | −23.92552 | 0.200 | | | |
| 20 | 49.91389 | 6.670 | 1.48749 | 70.42 | |
| 21 | −22.23213 | 10.000 | | | 19.79 |
| 22 | ∞ | 1.000 | 1.51680 | 64.20 | |
| 23 | ∞ | 8.733 | | | |

TABLE 8

| Example 4 | |
| --- | --- |
| f | 8.307 |
| Bf | 19.392 |
| FNo. | 1.85 |
| 2ω(°) | 105.2 |
| Y | 9.20 |
| CRA(°) | 4.729 |

TABLE 9

| | Example 4 | |
|---|---|---|
| Sn | 5 | 6 |
| KA | 1.0000000E+00 | 1.0000000E+00 |
| A3 | −1.2046691E−18 | 2.2888713E−17 |
| A4 | 9.3019521E−04 | 1.1123324E−03 |
| A5 | −2.6660648E−04 | −4.1617168E−04 |
| A6 | 5.9261740E−05 | 8.4465890E−05 |
| A7 | −5.6476448E−06 | −2.2416834E−06 |
| A8 | −1.2576443E−06 | −2.5102331E−06 |
| A9 | 3.1331558E−07 | 1.6018785E−07 |
| A10 | 9.9773850E−09 | 6.0424532E−08 |
| A11 | −8.1092582E−09 | −5.1746091E−09 |
| A12 | 2.7716769E−10 | −8.3613188E−10 |
| A13 | 1.1227093E−10 | 7.7626188E−11 |
| A14 | −7.6256237E−12 | 7.1833497E−12 |
| A15 | −8.6296256E−13 | −6.2029402E−13 |
| A16 | 7.7451525E−14 | −4.0573836E−14 |
| A17 | 3.4697903E−15 | 2.5548125E−15 |
| A18 | −3.6855671E−16 | 1.4947384E−16 |
| A19 | −5.6936564E−18 | −4.2753154E−18 |
| A20 | 6.8283373E−19 | −2.7343114E−19 |

Example 5

Figure 5:
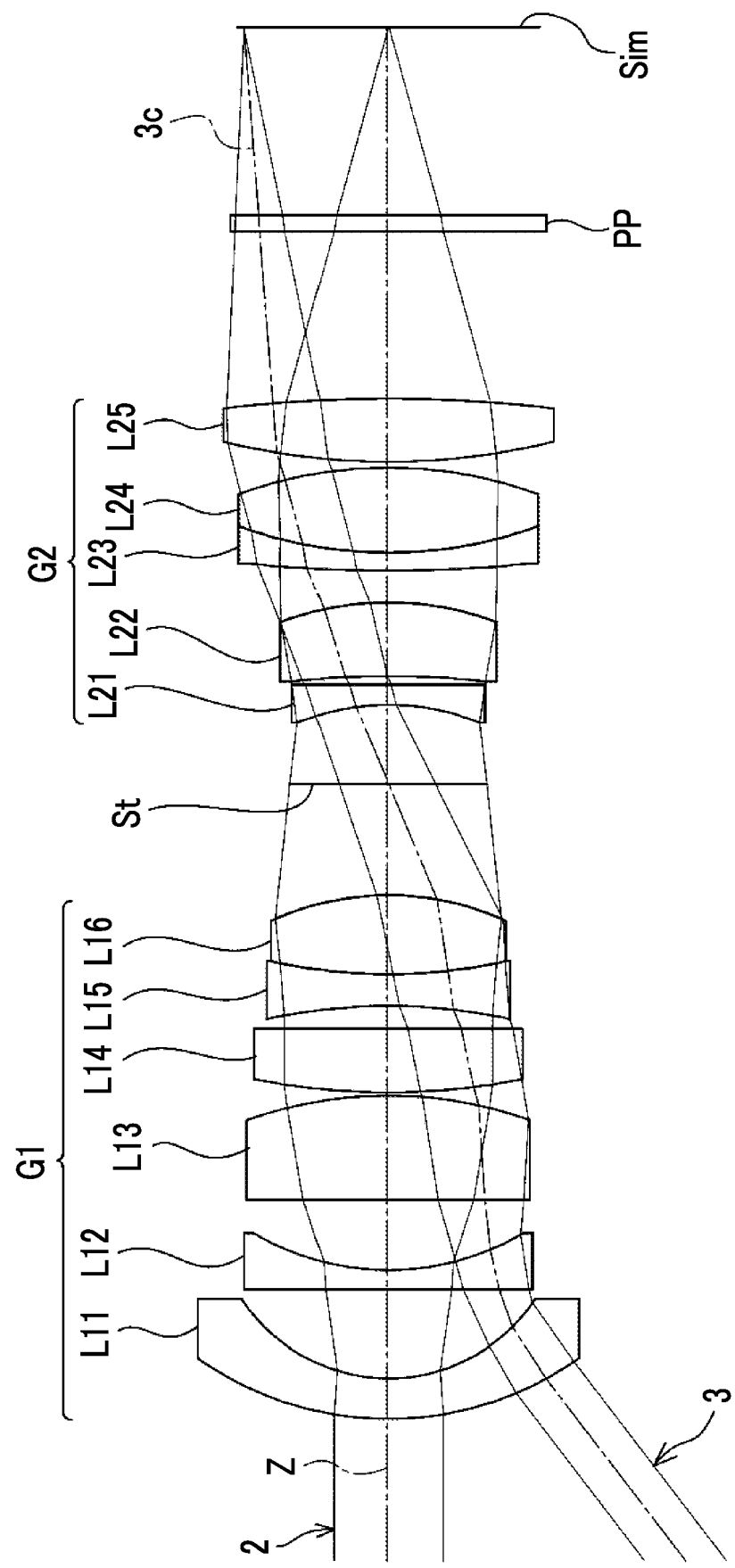
FIG. 5 is a cross-sectional view showing a composition of an imaging lens of Example 5 of the present invention.
Figure 11:
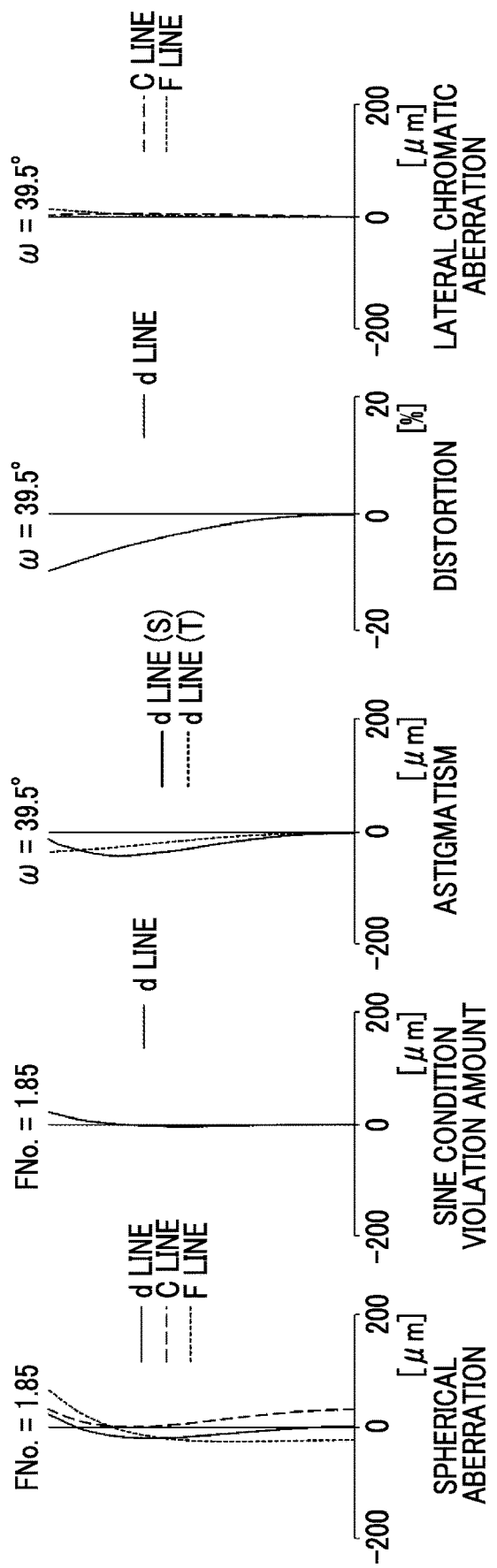
FIG. 11 is each aberration diagram of the imaging lens of Example 5 of the present invention.

FIG. 5 is a cross-sectional view showing a composition of an imaging lens of Example 5. The imaging lens of Example 5 consists of, in order from the object side toward the image side, a first lens group G1 having a positive refractive power, an aperture stop St, and a second lens group G2 having a positive refractive power. The first lens group G1 consists of six lenses L11 to L16, in order from the object side toward the image side, and the second lens group G2 consists of five lenses L21 to L25, in order from the object side toward the image side. Regarding the imaging lens of Example 5, Table 10 shows basic lens data, Table 11 shows specifications, and FIG. 11 shows each aberration diagram.

TABLE 10

| | Example 5 | | | | |
|---|---|---|---|---|---|
| Sn | R | D | Nd | vd | ED |
| 1 | 20.41445 | 2.420 | 2.00100 | 29.13 | |
| 2 | 10.76445 | 5.340 | | | |
| 3 | ∞ | 1.170 | 1.62280 | 56.91 | |
| 4 | 16.39544 | 4.230 | | | |
| 5 | ∞ | 6.220 | 1.72825 | 28.31 | |
| 6 | −26.19033 | 0.200 | | | |
| 7 | 42.58435 | 3.820 | 1.92287 | 18.90 | |
| 8 | ∞ | 1.350 | | | |
| 9 | −35.83706 | 1.910 | 1.90366 | 31.42 | |
| 10 | 33.35000 | 4.730 | 1.71300 | 53.87 | |
| 11 | −17.36773 | 6.600 | | | |
| 12(St) | ∞ | 4.750 | | | |
| 13 | −14.93706 | 1.230 | 1.84667 | 23.79 | |
| 14 | ∞ | 0.500 | | | |
| 15 | −52.58636 | 4.410 | 1.83481 | 42.73 | |
| 16 | −19.12775 | 1.910 | | | |
| 17 | 87.44098 | 1.080 | 1.84667 | 23.79 | |
| 18 | 27.16700 | 5.080 | 1.49700 | 81.59 | |
| 19 | −27.16700 | 0.360 | | | |
| 20 | 42.67084 | 3.780 | 1.85151 | 40.73 | |
| 21 | −88.73563 | 10.000 | | | 20.17 |
| 22 | ∞ | 1.000 | 1.51680 | 64.20 | |
| 23 | ∞ | 11.260 | | | |

TABLE 11

| | Example 5 |
|---|---|
| f | 12.371 |
| Bf | 21.919 |
| FNo. | 1.85 |
| 2ω(°) | 79.0 |
| Y | 9.20 |
| CRA(°) | 4.695 |

Example 6

Figure 6:
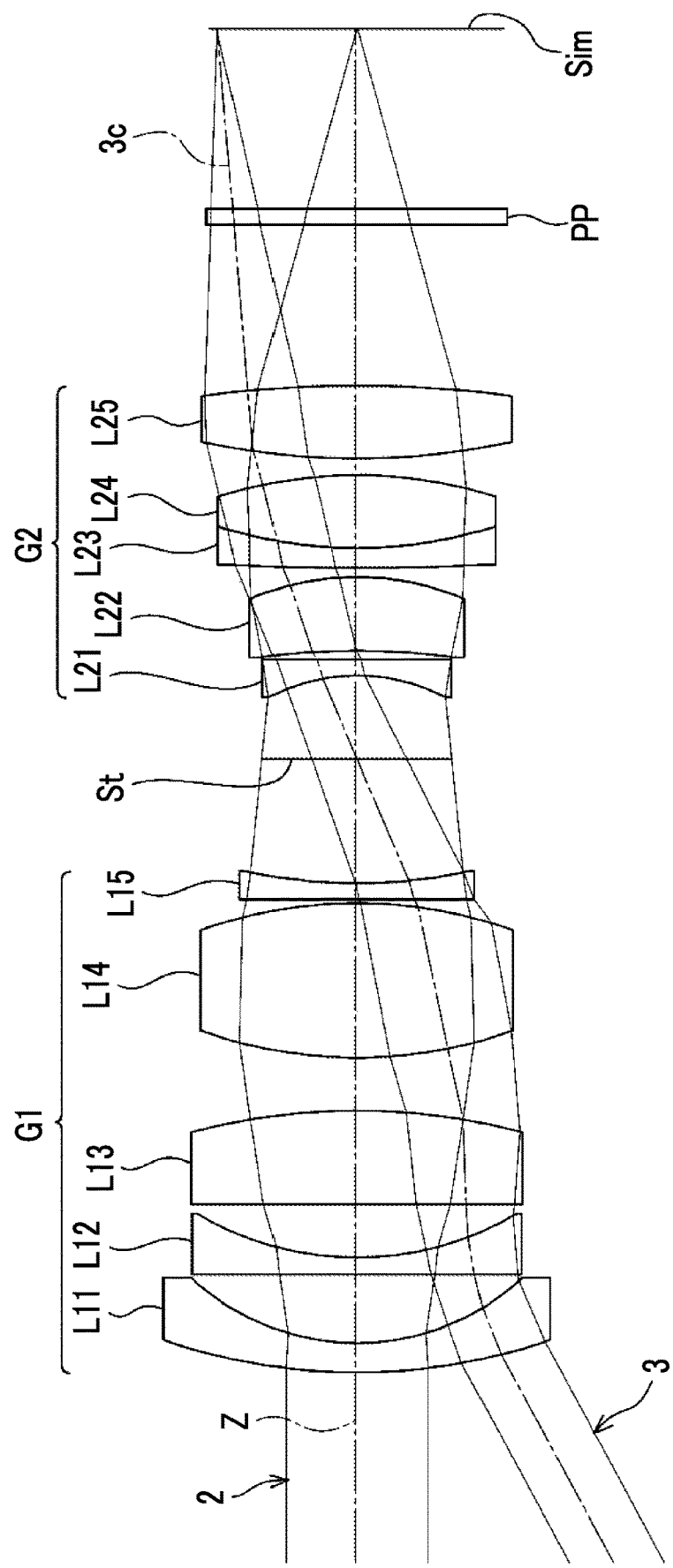
FIG. 6 is a cross-sectional view showing a composition of an imaging lens of Example 6 of the present invention.
Figure 12:
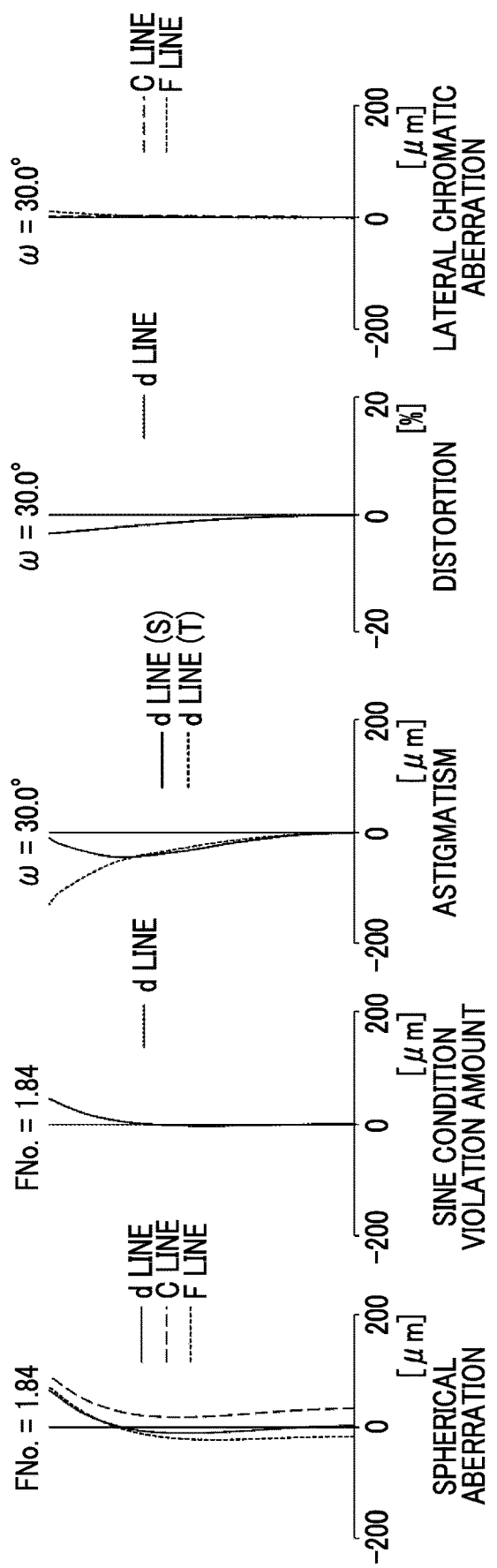
FIG. 12 is each aberration diagram of the imaging lens of Example 6 of the present invention.

FIG. 6 is a cross-sectional view showing a composition of an imaging lens of Example 6. The imaging lens of Example 6 consists of, in order from the object side toward the image side, a first lens group G1 having a positive refractive power, an aperture stop St, and a second lens group G2 having a positive refractive power. The first lens group G1 consists of five lenses L11 to L15, in order from the object side toward the image side, and the second lens group G2 consists of five lenses L21 to L25, in order from the object side toward the image side. Regarding the imaging lens of Example 6, Table 12 shows basic lens data, Table 13 shows specifications, and FIG. 12 shows each aberration diagram.

TABLE 12

| | Example 6 | | | | |
|---|---|---|---|---|---|
| Sn | R | D | Nd | vd | ED |
| 1 | 38.16230 | 1.810 | 1.85151 | 40.73 | |
| 2 | 15.45359 | 4.300 | | | |
| 3 | ∞ | 1.000 | 1.48749 | 70.42 | |
| 4 | 19.96225 | 3.310 | | | |
| 5 | ∞ | 5.770 | 1.90366 | 31.42 | |
| 6 | −41.01353 | 3.300 | | | |
| 7 | 29.60975 | 9.580 | 1.71300 | 53.87 | |
| 8 | −29.60975 | 0.240 | | | |
| 9 | ∞ | 1.000 | 1.62589 | 35.71 | |
| 10 | 33.39281 | 7.690 | | | |
| 11(St) | ∞ | 5.200 | | | |
| 12 | −12.32758 | 1.000 | 1.69895 | 30.05 | |
| 13 | ∞ | 0.560 | | | |
| 14 | −43.45462 | 4.570 | 1.80401 | 46.57 | |
| 15 | −17.73580 | 0.580 | | | |
| 16 | 164.25602 | 1.240 | 1.84667 | 23.79 | |
| 17 | 29.27900 | 4.500 | 1.61800 | 63.40 | |
| 18 | −29.27900 | 1.040 | | | |
| 19 | 46.98786 | 4.460 | 1.80401 | 46.57 | |
| 20 | −75.82447 | 10.000 | | | 19.59 |
| 21 | ∞ | 1.000 | 1.51680 | 64.20 | |
| 22 | ∞ | 11.205 | | | |

TABLE 13

| | Example 6 |
|---|---|
| f | 16.430 |
| Bf | 21.865 |
| FNo. | 1.84 |
| 2ω(°) | 60.0 |
| Y | 9.20 |
| CRA(°) | 5.067 |

Table 14 shows values corresponding to Conditional Expressions (1) to (8) of the imaging lenses of Examples 1 to 6. In Examples 1 to 6, the d line is set as the reference wavelength. Table 14 shows the values based on the d line.

TABLE 14

| Expression No. | | Example 1 | Example 2 | Example 3 |
|---|---|---|---|---|
| (1) | (Bf × tan(CRA))/Y | 0.115 | 0.189 | 0.202 |
| (2) | Bf/TL | 0.422 | 0.423 | 0.431 |
| (3) | dSt/f2 | −0.827 | −0.769 | −0.701 |
| (4) | Y/Bf − tan(CRA) | 0.357 | 0.350 | 0.346 |
| (5) | Bf/Y | 2.479 | 2.318 | 2.304 |
| (6) | URA | −2.870 | −1.524 | −1.804 |
| (7) | f/f1 | 0.375 | 0.223 | 0.585 |
| (8) | (rf − rr)/(rf + rr) | 5.060 | −22.355 | 45.578 |

| Expression No. | | Example 4 | Example 5 | Example 6 |
|---|---|---|---|---|
| (1) | (Bf × tan(CRA))/Y | 0.174 | 0.196 | 0.211 |
| (2) | Bf/TL | 0.308 | 0.359 | 0.358 |
| (3) | dSt/f2 | −0.759 | −0.748 | −0.737 |
| (4) | Y/Bf − tan(CRA) | 0.392 | 0.338 | 0.332 |
| (5) | Bf/Y | 2.108 | 2.382 | 2.377 |
| (6) | URA | −1.564 | −1.999 | −1.265 |
| (7) | f/f1 | 0.263 | 0.402 | 0.351 |
| (8) | (rf − rr)/(rf + rr) | −0.314 | 0.075 | 2.170 |

As can be seen from the above data, the imaging lenses of Examples 1 to 6 have long back focuses in comparison with the maximum image height, CRAs in a range of 0 to 6 degrees, and URAs in a range of −3 to 0 degrees, and thus the composition is advantageous for securing the light amount. In addition, the imaging lenses of Examples 1 to 6 can achieve reductions in size and realize the high optical performances by favorably correcting various aberrations.

Figure 16:
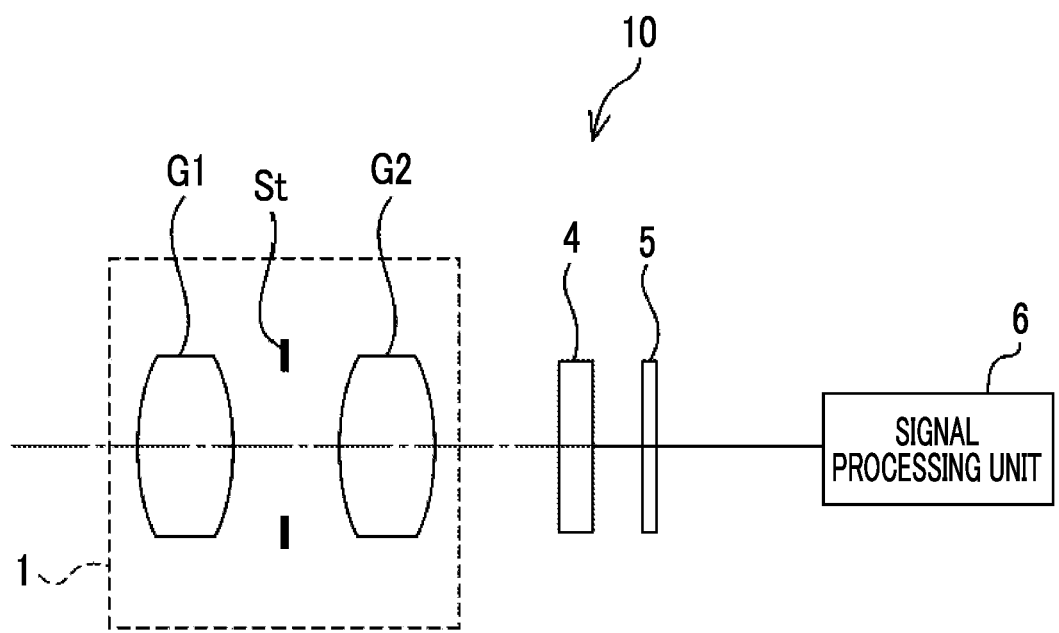
FIG. 16 is an outline composition diagram of the imaging apparatus according to an embodiment of the present invention.

Next, an imaging apparatus according to an embodiment of the present invention is described. FIG. 16 shows an outline composition diagram of an imaging apparatus 10 using an imaging lens 1 according to the embodiment of the present invention as an imaging apparatus according to an embodiment of the present invention. Examples of the imaging apparatus 10 can include a camera for factory automation (FA), a camera for machine vision (MV), or a camera for monitoring.

The imaging apparatus 10 comprises the imaging lens 1, a filter 4 disposed on the image side of the imaging lens 1, an imaging element 5, and a signal processing unit 6 which performs arithmetic processing on an output signal from the imaging element 5. In FIG. 16, a first lens group G1, an aperture stop St, and a second lens group G2 included in the imaging lens 1 are conceptually shown. The imaging element 5 captures an image of a subject, which is formed by the imaging lens 1, to convert the image into an electrical signal, and for example, a CMOS sensor or a charge coupled device (CCD) sensor can be used as the imaging element 5. The imaging element 5 is disposed for the imaging surface of the imaging element 5 to coincide with the image plane Sim of the imaging lens 1.

The present invention has been hitherto described through embodiments and examples, but the present invention is not limited to the above-described embodiments and examples, and may be modified into various forms. For example, values of the radius of curvature, the surface distance, the refractive index, the Abbe number, and the aspherical coefficient of each lens are not limited to the values shown in the numerical examples, and different values may be used therefor.

The imaging apparatus according to the embodiment of the present invention is not also limited to the above-described examples, and for example, various aspects such as digital cameras and in-vehicle cameras can be employed for the imaging apparatus.

What is claimed is:
1. An imaging lens consisting of, in order from an object side toward an image side:
   a first lens group;
   a stop; and
   a second lens group having a positive refractive power,
   wherein the second lens group includes a negative lens on a side closest to an object,
   the second lens group includes a lens component having a positive refractive power on a side closest to an image,
   the lens component is a single lens or a cemented lens, and
   in a case where
      a back focus in an air conversion length is Bf,
      an angle between a principal light ray incident on a maximum image height of an image plane and an axis parallel to an optical axis is CRA,
      the maximum image height is Y,
      a distance on the optical axis from a lens surface on the side closest to the object to a lens surface on the side closest to the image is TL,
      a distance on the optical axis from an object side principal point of the second lens group, as a reference, to the stop is dSt,
      a focal length of the second lens group is f2,
      regarding CRA, a sign of a clockwise angle with respect to the axis parallel to the optical axis is negative and a sign of a counterclockwise angle is positive, and
      regarding dSt, a sign of a distance from the reference to the object side is negative and a sign of a distance from the reference to the image side is positive,
   Conditional Expressions (1), (2), (3), and (4) are satisfied, which are represented by

$$0<\{Bf\times\tan(CRA)\}/Y<0.4 \quad (1)$$

$$0.2<Bf/TL<0.6 \quad (2)$$

$$-1<dSt/f2<-0.6 \quad (3)$$

$$0.3<Y/Bf-\tan(CRA)<0.4 \quad (4).$$

2. The imaging lens according to claim 1, wherein Conditional Expression (5) is satisfied, which is represented by $$1.85<Bf/Y<4 \quad (5).$$

3. The imaging lens according to claim 1, wherein, in a case where
   an angle between an edge light ray which is a light ray most distant from the optical axis among light rays incident on the maximum image height of the image plane and the axis parallel to the optical axis is URA, and
   regarding URA, a sign of a clockwise angle with respect to the axis parallel to the optical axis is negative and a sign of a counterclockwise angle is positive, and a unit of URA is a degree,
   Conditional Expression (6) is satisfied, which is represented by $$-5<URA<5 \quad (6).$$

4. The imaging lens according to claim 1, wherein the second lens group consists of, in order from the object side toward the image side, the negative lens, two positive lenses, and the lens component having a positive refractive power.

5. The imaging lens according to claim 1,
wherein the second lens group consists of, in order from the object side toward the image side, the negative lens, a positive lens, a cemented lens obtained by cementing two lenses which have refractive powers of signs different from each other, and a positive lens.

6. The imaging lens according to claim 1,
wherein the first lens group includes a negative lens and two positive lenses, in consecutive order from the side closest to the image toward the object side.

7. The imaging lens according to claim 1,
wherein, in a case where
a focal length of the imaging lens is f, and
a focal length of the first lens group is f1,
Conditional Expression (7) is satisfied, which is represented by $$0 \leq f/f1 < 0.7 \tag{7}$$

8. The imaging lens according to claim 1,
wherein, in a case where
a radius of curvature of a lens surface on the side closest to the image in the first lens group is rf, and
a radius of curvature of a lens surface on the side closest to the object in the second lens group is rr,
Conditional Expression (8) is satisfied, which is represented by $$-60 < (rf-rr)/(rf+rr) < 60 \tag{8}$$

9. The imaging lens according to claim 1,
wherein Conditional Expression (1-1) is satisfied, which is represented by $$0.1 < \{Bf \times \tan(CRA)\}/Y < 0.3 \tag{1-1}$$

10. The imaging lens according to claim 1,
wherein Conditional Expression (2-1) is satisfied, which is represented by $$0.3 < Bf/TL < 0.5 \tag{2-1}$$

11. The imaging lens according to claim 1,
wherein Conditional Expression (3-1) is satisfied, which is represented by $$-0.9 < dSt/f2 < -0.7 \tag{3-1}$$

12. The imaging lens according to claim 1,
wherein Conditional Expression (4-1) is satisfied, which is represented by $$0.32 < Y/Bf - \tan(CRA) < 0.4 \tag{4-1}$$

13. The imaging lens according to claim 2,
wherein Conditional Expression (5-1) is satisfied, which is represented by $$2 < Bf/Y < 3 \tag{5-1}$$

14. The imaging lens according to claim 3,
wherein Conditional Expression (6-1) is satisfied, which is represented by $$-3 < URA < 0 \tag{6-1}$$

15. The imaging lens according to claim 7,
wherein Conditional Expression (7-1) is satisfied, which is represented by $$0.2 < f/f1 < 0.6 \tag{7-1}$$

16. The imaging lens according to claim 8,
wherein Conditional Expression (8-1) is satisfied, which is represented by $$-50 < (rf-rr)/(rf+rr) < 50 \tag{8-1}$$

17. An imaging apparatus comprising the imaging lens according to claim 1.

* * * * *